(12) United States Patent
Mitsuta (10) Patent No.: US 7,867,660 B2
(45) Date of Patent: Jan. 11, 2011

(54) FUEL CELL AND METHOD OF PRODUCING THE SAME

(75) Inventor: Naoki Mitsuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 910 days.

(21) Appl. No.: 11/798,538

(22) Filed: May 15, 2007

(65) Prior Publication Data

US 2007/0269709 A1    Nov. 22, 2007

(30) Foreign Application Priority Data

May 16, 2006   (JP) .............................. 2006-136607

(51) Int. Cl.
*H01M 8/06* (2006.01)

(52) U.S. Cl. ........................ 429/414; 429/405; 429/457; 429/456; 429/463; 429/474; 429/483; 429/512; 429/518; 429/535

(58) Field of Classification Search ................. 429/405, 429/407, 414, 457, 545, 456, 458, 460, 463, 429/469, 474, 483, 508, 512, 514, 518, 535

See application file for complete search history.

(56) References Cited

FOREIGN PATENT DOCUMENTS

| JP | 2002-298871 A | | 10/2002 |
|----|---------------|---|---------|
| JP | 2004-22254 A  | | 1/2004  |
| JP | 2005-093243   | * | 4/2005 |
| JP | 2005-93243 A  | | 4/2005  |

* cited by examiner

*Primary Examiner*—Patrick Ryan
*Assistant Examiner*—Ben Lewis
(74) *Attorney, Agent, or Firm*—Arent Fox, LLP (57) ABSTRACT

In the fuel cell including a membrane electrode assembly, the diffusion layer of the membrane electrode assembly includes an electrode part having one surface in contact with the electrode catalytic layer and the other surface facing the separator and a non-electric-power generating part around the electrode part having one surface in contact with the solid polymer electrolytic membrane and the other surface facing the separator. The non-electric-power generating part includes a hydrophilic part near an outlet of the fluid passage of the reaction gas, and a hydrophobic layer formed on the hydrophilic part and exposed to the fluid passage to discharge water generated in generating an electric power.

9 Claims, 8 Drawing Sheets

FUEL CELL AND METHOD OF PRODUCING THE SAME

CROSS REFERENCE TO RELATED APPLICATIONS

This application claims the foreign priority benefit under Title 35, United States Code, §119(a)-(d) of Japanese Patent Application No. 2006-136607, filed on May 16, 2006 in the Japan Patent Office, the disclosure of which is herein incorporated by reference in its entirety.

BACKGROUND OF THE INVENTION

1. Field of the Invention

The present invention relates to a fuel cell and a method of producing the same.

2. Description of the Related Art

Fuel cells are known which includes single cells each including a membrane electrode assembly having electrode catalytic layers and gas diffusion layers on both surfaces of a solid polymer electrolytic membrane, respectively, the membrane electrode assembly being sandwiched between a pair of separators having fluid passages for reaction gases. The fuel cell generates electric power through an electrochemical reaction between oxygen in air supplied to the electrode catalytic layer on the cathode and hydrogen in a fuel gas supplied to the electrode catalytic layer on the anode in which water is generated during the electric power generation. In the fuel cell, both the supplied air and hydrogen (reaction gases) are humidified for improvement in an ion conductivity in the solid polymer electrolytic membrane. If water generated by the electrochemical reaction and the humidification impedes flows of the reaction gases, an electric power generation capability of the fuel cell decreases.

In order to improve drainage, JP 2002-298871A proposed a fuel cell in which outlets of flow passages of reaction gases are subject to a hydrophilic treatment. JP 2005-93243A proposes a fuel cell subjected to a hydrophilic process at a part of a gas diffusion layer, forming the membrane electrode assembly, which is not overlapped with the electrode catalytic layer and near an outlet of the fluid passage of the reaction gas. JP 2004-22254A proposes a fuel cell in which the gas diffusion layers are subjected to a hydrophobic treatment at the gas diffusion layers to prevent water from penetrating the gas diffusion layers.

SUMMARY OF THE INVENTION

A first aspect of the present invention provides a fuel cell comprising: a membrane electrode assembly including: a solid polymer electrolytic membrane; an electrode catalytic layer and a diffusion layer on both surfaces of the solid polymer electrolytic membrane, respectively; and a pair of separators including fluid passages of reaction gases for sandwiching the membrane electrode assembly, wherein the diffusion layer includes: an electrode part having one surface in contact with the electrode catalytic layer and the other surface facing the separator; and a non-electric-power generating part around the electrode part having one surface in contact with the solid polymer electrolytic membrane and the other surface facing the separator, and wherein the non-electric-power generating part includes, in the vicinity of an outlet of the fluid passage of the reaction gas, a hydrophilic part and a hydrophobic part formed on the hydrophilic part and exposed to the fluid passage.

In the fuel cell, water drops appearing on the surface of the electrode part of the gas diffusion layer may be carried toward the outlet of the reaction gas by the flow of the reaction gas in the fluid passage formed in the separator. The surface of the non-electric-power generating part facing the solid polymer electrolytic membrane around the electrode part may have a hydrophobicity higher than that of the electrode part on the side of the separator. This may prevent the water drops carried in the vicinity of the outlet of the reaction gas from penetrating the gas diffusion layer (non-electric-power generating part). In other words, the water drops carried in the vicinity of the outlet of the reaction gas may be efficiently discharged through the outlet of the fluid passage of the reaction gas.

A second aspect of the present invention provides the fuel cell based on the first aspect, wherein the hydrophobic part has a contact angle $\theta 1$ of ethylene glycol, the electrode part has a contact angle $\theta 2$ of ethylene glycol, and a difference of $(\theta 1-\theta 2)$ is equal to or greater than −20 degrees and equal to or smaller than 20 degrees.

The difference of $(\theta 1-\theta 2)$ may prevent the water drops from staying on the surface of the hydrophilic part on the side of the separator. Making the difference of $(\theta 1-\theta 2)$ smaller than 20 degrees may reduce a resistance in movement of the water drops from the surface of the electrode part on the side of the separator to the surface of the hydrophilic part on the separator. As the result, the water drops are more efficiently discharged from the outlet of the fluid passage of the reaction gas in the separator.

A third aspect of the present invention provides the fuel cell based on the first aspect, wherein, when an extending plane of the membrane electrode assembly is arranged in a vertical direction and the outlet of fluid passage of the reaction gas is arranged at a lower position of the fuel cell, the hydrophilic part has a part exposed to the separator, and wherein the hydrophobic part is arranged lower than the part of the hydrophilic part exposed to the separator.

In this case, the membrane electrode assembly is arranged so as to lower the outlet of the fluid passage of the reaction gas, so that the water drops are efficiently carried in the vicinity of the outlet of the fluid passage of the reaction gas by the flow of the reaction gas and the force of the gravity. Then, the hydrophobic process is applied to the surface of the gas diffusion layer which is lower (in the vertical direction) than the part of the hydrophilic part exposed to the separator and where more water drops are collected. This prevents water drops from penetrating the hydrophilic part. As a result, the water drops carried in the vicinity of the outlet of the fluid passage of the reaction gas may be efficiently discharged from the outlet of the fluid passage of the reaction gas. In addition, because the upper part of the hydrophilic part exposed to the separator, where a smaller quantity of water is collected than the hydrophobic layer which is lower than the upper part, is not subjected to the hydrophobic process, the upper part pulls in water in the electrode part (gas diffusion layer) adjacent to the upper part and the penetrating water is vaporized by the reaction gas passing beside the upper part and discharged from the outlet of the fluid passage of the reaction gas.

A fourth aspect of the present invention provides a fuel cell based on the third aspect, wherein the hydrophobic part has a contact angle of ethylene glycol which is equal to or greater than 100 degrees and the part of the hydrophilic part has a contact angle of ethylene glycol which is smaller than 90 degrees.

In this case, setting the contact angle of ethylene glycol on the surface on the hydrophobic layer to 100 degrees or more may prevent the water drops collected on the surface of the hydrophobic layer from penetrating the hydrophilic part. More specifically, the water collected in the vicinity of outlet of the fluid passage of the reaction gas is efficiently discharged from the outlet of the fluid passage of the reaction gas in the separator. Further, setting the contact angle of ethylene glycol on the hydrophilic part exposed to the fluid passage above the hydrophobic layer to 90 degrees or smaller may cause the hydrophilic part exposed to the separator above the hydrophobic layer to pull the water contained in the electrode part (gas diffusion layer) and efficiently vaporize the pulled-in water in the reaction gas.

In addition, preferably, the contact angle of ethylene glycol on the hydrophobic layer exposed to the fluid passage below the hydrophilic part exposed to the separator is equal to or smaller than 150 degrees. This is because the contact angle of 150 degrees may provide a sufficient hydrophobic effect at the contact angle of 150 degrees. On the other hand, preferably, the upper part of the hydrophilic part exposed to the separator above the hydrophobic layer has a contact angle equal to or greater than 10 degrees. This is because a function an operation of drawing water is sufficiently given without any additional hydrophilic processing.

A fifth aspect of the present invention provides a fuel cell based on the first aspect, wherein the hydrophobic part has a contact angle of ethylene glycol which is grater than the contact angle of a surface of the separator in the fluid passage.

In this case, the resistance in movement of water from the surface of the hydrophobic layer on the side of the separator to the surface of the separator may be reduced. As a result, the water may be efficiently discharged from the membrane electrode assembly to the outlet of the fluid passage of the reaction gas formed in the separator.

A sixth aspect of the present invention provides a method of producing a fuel cell including a membrane electrode assembly including: a membrane electrode assembly including: a solid polymer electrolytic membrane; an electrode catalytic layer and a diffusion layer on both surfaces of the solid polymer electrolytic membrane, respectively; and a pair of separators including fluid passages of reaction gases for sandwiching the membrane electrode assembly, wherein the diffusion layer includes: an electrode part having one surface in contact with the electrode catalytic layer and the other surface facing the separator; and a non-electric-power generating part around the electrode part having one surface in contact with the solid polymer electrolytic membrane and the other surface facing the separator, the method comprising: a first process of forming a hydrophilic part at the non-electric-power generating part in the vicinity of an outlet of the fluid passage of the reaction gas; and a second process includes a hydrophobic process on a surface of the hydrophilic part on the side of the separator after the first process.

In this method, after formation of the hydrophilic part at the non-electric-power generating part, the hydrophobic process may be applied to the surface of the hydrophilic part on the side of the separator. This may produce the fuel cell having the electrode part showing a hydrophobicity higher than the surface of the electrode part on the side of the separator.

A seventh aspect of the present invention provides the method based on the sixth aspect, wherein the hydrophobic process includes a step of applying a hydrophobic agent on the surface of the hydrophilic part.

The present invention may provide a fuel cell and a method of producing the same which can prevent the electric power generation capability from decreasing because the water carried in the vicinity of the outlet of the reaction gas is effectively discharged.

BRIEF DESCRIPTION OF THE DRAWINGS

The object and features of the present invention will become more readily apparent from the following detailed description taken in conjunction with the accompanying drawings in which:

FIGS. 5A to 5D shows a method of producing the membrane assembly in which FIGS. 5A to 5C are cross-sectional views of the membrane electrolytic assembly, and FIG. 5D is a plan view of the membrane electrolytic assembly:

The same or corresponding elements or parts are designated with like references throughout the drawings.

DETAILED DESCRIPTION OF THE INVENTION

Prior to describing an embodiment of the present invention, the above-mentioned related art will be further explained.

In the fuel cells disclosed by JP 2002-298871A and JP 2005-93243A, water may stay around the outlets of the reaction gases to which the hydrophilic treatment is applied. This may make the drainage rather worse. Particularly, in the fuel cell disclosed in JP 2005-93243A a power generation capability may decrease because water, staying in the gas diffusion layer in the vicinity of the outlets of the reaction gases, prevents the reaction gases from diffusing into the electrode catalytic layer.

Further, in the fuel cell disclosed in JP 2004-22254A during forming the gas diffusion layers on the electrode catalytic layers in the solid polymer electrolytic membrane, the gas diffusion layers are adhered to the solid polymer electrolytic membrane with an adhesive at a periphery of the electrode catalytic layer (non-power generating part). This makes the non-electric-power generating part of the gas diffusion layers hydrophilic with the adhesive. In other words, although the gas diffusion layer part (power-generating part) in contact with the electrode catalytic layer shows hydrophobic property, the gas diffusion layer part (non-electric-power generating part) in contact with the solid polymer electrolytic membrane at the periphery of the electrode catalytic layer is made hydrophilic. Accordingly, in the fuel cell disclosed in JP 2004-22254A, water may penetrate the gas diffusion layer in the vicinity of the outlet of the reaction gas, so that the vicinity of the electrode is filled with water, which may decrease the power generating property.

The present invention provides a fuel cell and a method of producing the same without decrease in the electric power generation capability due to the generated water and water used for humidifying.

First Embodiment

Figure 1:
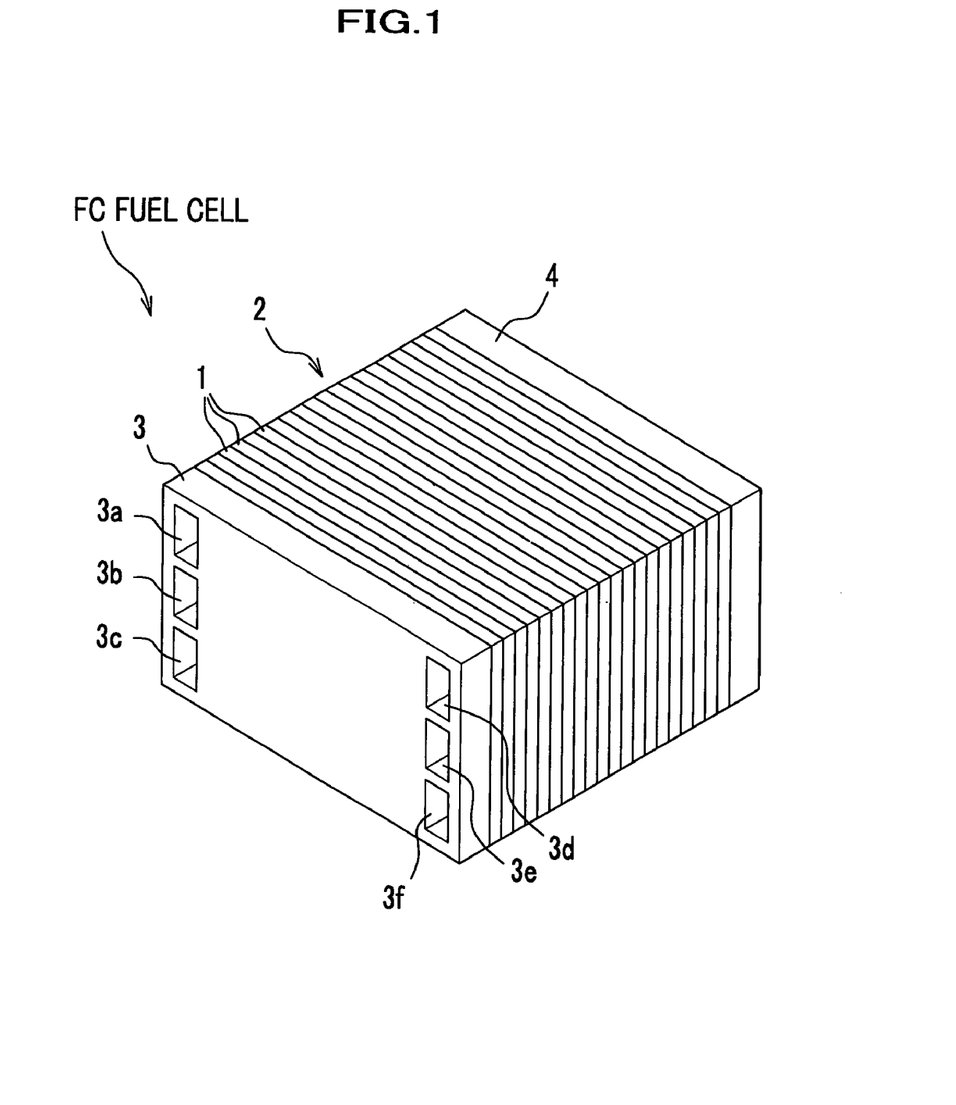
FIG. 1 is a perspective view of a fuel cell according to a first embodiment of the present invention.
Figure 2:
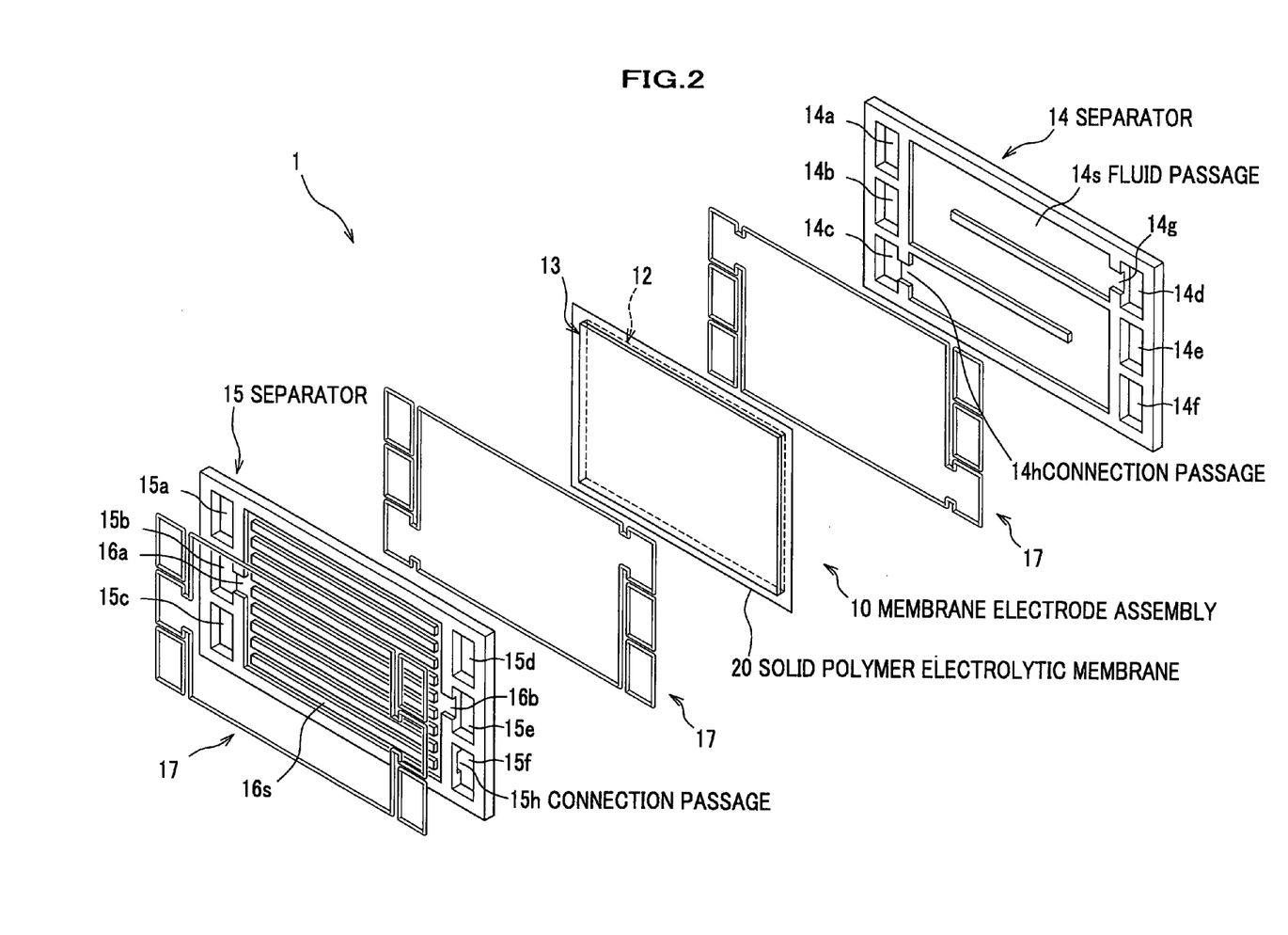
FIG. 2 is an exploded perspective view of a lamination structure in a single cell shown in FIG. 1.
Figure 3:
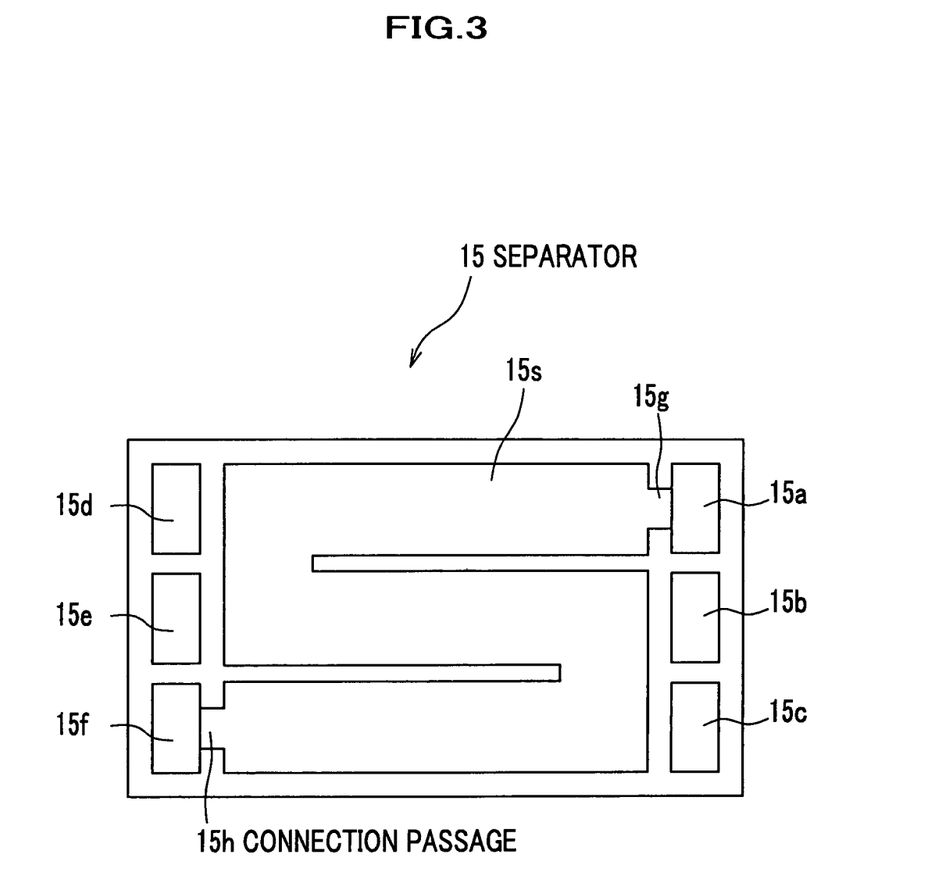
FIG. 3 is a plan view of a separator arranged on a side of a cathode of the fuel cell shown in FIG. 2, viewed from the side of the cathode.

With reference to drawings will be described a fuel cell according to a first embodiment of the present invention. FIG. 1 is a perspective view of the fuel cell of the first embodiment. FIG. 2 is an exploded perspective view showing a lamination structure of a single cell. FIG. 3 is a plan view of a separator arranged on a side of a cathode viewed from the side of the cathode.

Figure 4A:
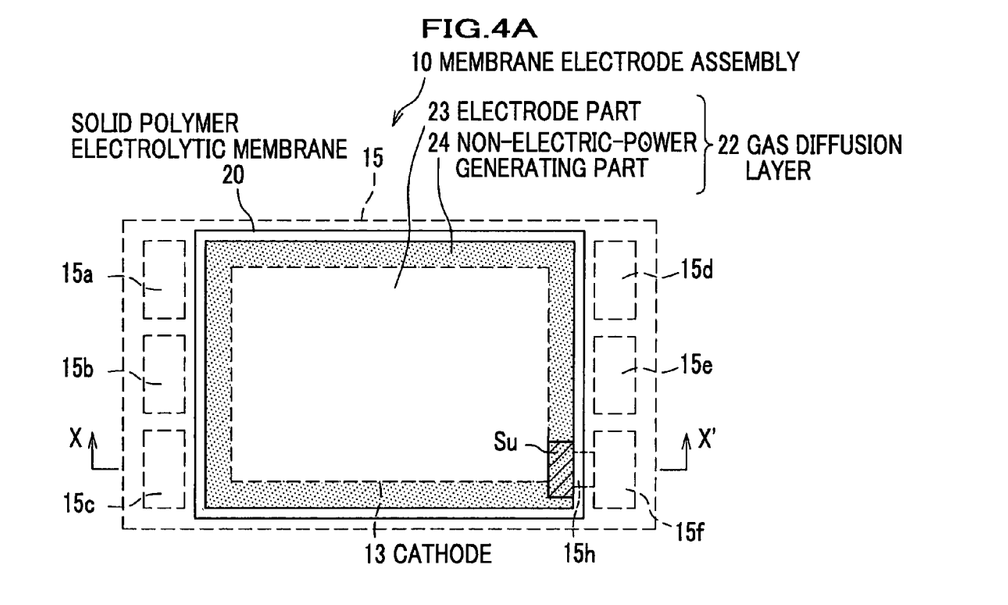
FIG. 4A is a plan view of a membrane electrode assembly according to the first embodiment, viewed from the side of the cathode.

FIG. 4A is a plan view of a membrane electrode assembly viewed from the side of the cathode.

Figure 4B:
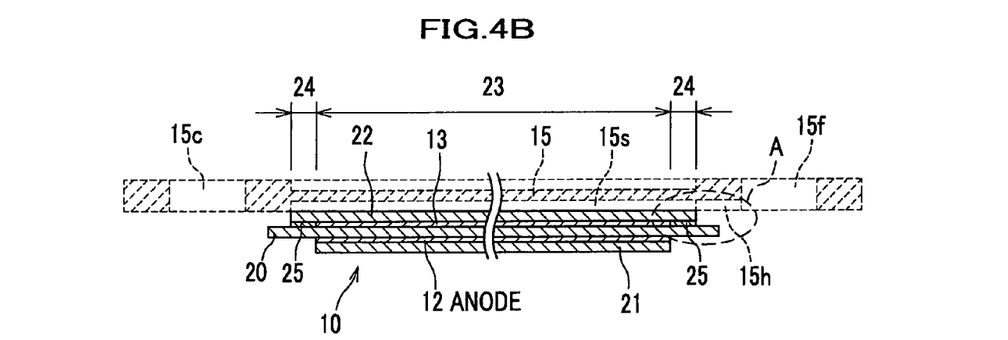
FIG. 4B is a sectional view, taken along line X-X' in FIG. 4A.
Figure 4C:
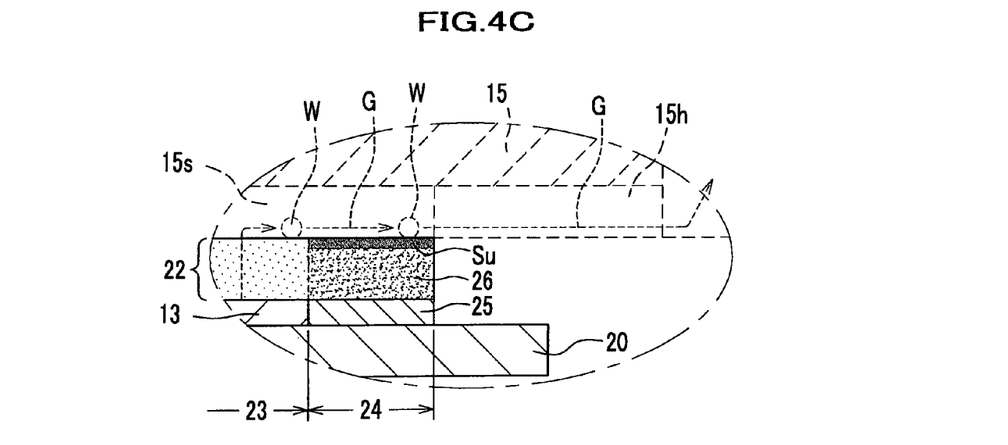
FIG. 4C is an enlarged view of a part A in FIG. 4B.

FIG. 4B is a sectional view, taken along X-X' in FIG. 4A, and FIG. 4C is an enlarged view of a part A in FIG. 4B, where seal members are omitted;

As shown in FIG. 1, the fuel cell FC according to the first embodiment is of an internal manifold type, which has a stack body 2 including a plurality of single cells 1 stacked.

As shown in FIGS. 2 and 3, the single cell 1 includes a membrane electrode assembly (MEA) 10 sandwiched between a pair of conductive separators 14 and 15. The separator 14 is arranged to face a surface of the membrane electrode assembly 10 on the side of the anode 12. The separator 14 has a fluid passage 14s for allowing hydrogen (reaction gas) flowing therethrough in a surface of the separator 14 facing the membrane electrode assembly 10. The separator 14 further includes through holes 14a, 14b, and 14c at upper, middle, and a lower parts on a back side of the perspective view of FIG. 2 and through holes 14d, 14e, and 14f at upper, middle, and a lower parts on a front side of the perspective view of FIG. 2. In addition, the separator 14 includes connection passage 14g for connecting the through hole 14d to fluid passage 14s and a connection passage 14h for connecting the fluid passage 14s to the through hole 14c.

The separator 15 is arranged to face a surface of the membrane electrode assembly 10 on the side of the anode 13. The separator 15 has a fluid passage 15s for allowing air (oxygen) as a reaction gas to flow therethrough in a surface thereof facing the membrane electrode assembly 10. The separator 15 further includes through holes 15a, 15b, and 15c at upper, middle, and lower parts on the back side of the perspective view of FIG. 2, respectively, and through holes 15d, 15e, and 15f at upper, middle, and lower parts on a front side of the perspective view of FIG. 2 respectively. In addition, the separator 15 includes, as shown in FIG. 3, connection passage 15g for connecting the through hole 15a to fluid passage 15s and a connection passage 15h for connecting the fluid passage 15s to the through hole 15f.

As shown in FIGS. 2 and 3, the separator 15 has a coolant passage 16s for allowing a coolant water to flow in a surface opposite to the surface in which the fluid passage 15s is formed. The coolant water cools the fuel cell FC by flowing in the coolant passage 16s. The separator 15 includes a connection passage 16a for connecting the through hole 15b to the coolant passage 16s and a connection passage 16b for connecting the coolant passage 16s to the through hole 15e.

Thus, when a plurality of single cells 1 are stacked to form a stack body 2 (see FIG. 1), the through hole 14d and the through hole 15d are connected to each other to form a supply passage of the hydrogen for the fluid passage 14s in the separator 14. Similarly, the through hole 14c and the through hole 15c are connected to each other to form a discharging passage for discharging the hydrogen in the fluid passage 14s. In this fuel cell FC, if a surface (extending) direction of the membrane electrode assembly 10 is arranged in the vertical direction, the connection passage 14h (outlet of the hydrogen gas) is arranged at a lower part of the separator 14 in the vertical direction.

The through holes 14a and 15a are connected to each other to form a supply passage for supplying air (oxygen) to the fluid passage 15s (see FIG. 3) of the separator 15. Similarly, the through hole 14f and the through hole 15f are connected to each other to form a discharging passage for discharging the air (oxygen) in the fluid passage 15s. In this fuel cell FC, if a surface direction of the membrane electrode assembly 10 is arranged in the vertical direction, the connection passage 15h (outlet of the air) is arranged at a lower part of the separator 15 in the vertical direction.

The through holes 14b and 15b are connected to each other to form a supply passage for supplying the coolant to the coolant passage 16s (see FIG. 3) of the separator 15. Similarly, the through hole 14e and the through hole 15e are connected to each other to form a discharging passage for discharging the coolant water in the coolant passage 16s.

The membrane electrode assembly 10 has, as shown in FIGS. 4A and 4B, the solid polymer electrolytic membrane 20, an anode 12 (see FIG. 4B) formed on one surface of the solid polymer electrolytic membrane 20, a gas diffusion layer 21 (see FIG. 4B) formed on the side of the anode 12, and a gas diffusion layer 22 formed on the side of the cathode 13. The anode 12 and the cathode 13 may be also referred to as electrode catalytic layers.

A peripheral edge of the solid polymer electrolytic membrane 20 outwardly extends from peripheral edges of the anode 12 and the cathode 13. The anode 12 has a gas diffusion layer 21 on a side of the separator 14 (see FIG. 2), and the cathode 13 has a gas diffusion layer 22 (see FIG. 4A) on a side of the separator 15 (see FIG. 2). As the anode 12 and the cathode 13, are available well-known anode members and cathode members. For example, a catalyst paste can be used which is coated and dried on surfaces of gas permeable members forming the gas diffusion layers 21 and 22 mentioned below. For example, as the catalytic paste are available a catalyst such as platinum and palladium, electrically-conductive grains such as carbon black, and an ion conductive binder such as polymer electrolyte.

The gas diffusion layer 21 diffuses the hydrogen flowing through the fluid passage 14s toward the anode 12 (see FIG. 4B) while the hydrogen is supplied from the through hole 14d and the connection passage 14g to the fluid passage 14s, and discharged from the fluid passage 14s through the connection passage 14h and the through hole 14c.

The gas diffusion layer 22 diffuses the air (oxygen) flowing through the fluid passage 15s toward the cathode 13 (see FIG. 4B) while the air (oxygen) is supplied through the through hole 15a and the connection passage 15g to the fluid passage 15s and discharged from the fluid passage 15s through the connection passage 15h and the through hole 15f.

Materials of the gas diffusion layer 21 and 22 may be those well-known, and thus, a gas permeable material such as carbon paper is available.

In the membrane electrode assembly 10 thus formed, the gas diffusion layer 22 has an electrode part 23 facing the cathode (electrode catalytic layer) and a non-electric-power generating part 24 facing the solid polymer electrolytic membrane 20 around the electrode part 23.

The non-electric-power generating part 24 is a part of the gas diffusion layer 22 adhered to the solid polymer electrolytic membrane 20 by an adhesive layer 25 (see FIG. 4B). At the non-electric-power generating part 24 the gas diffusion layer 22 is hydrophilized by the adhesive layer 25 to form the hydrophilic part 26. The adhesive layer 25 is made of an adhesive. Although any adhesive is usable, an adhesive is preferable which has any extension on tensile breaking equal to or higher than 150% after hardened and un-soluble in water. Particularly, silicone adhesives are preferable, and addition-cured silicone adhesives containing an alkenyl group are more preferable.

Further, as shown in FIGS. 4A and 4C, at the non-electric-power generating part 24, the gas diffusion layer 22 is subjected to a hydrophobic process on a surface thereof on a side of the separator 15 in the vicinity of an outlet of the air (reaction gas) of the separator 15 to form a hydrophobic layer Su. More specifically, the surface of the hydrophilic part 26 on the side of the separator 15 is made to have hydrophobicity. Here, the term "having hydrophobicity" means that a contact angle with ethylene glycol on that surface is equal to or higher than 90 degrees. As the hydrophobic process for forming the hydrophobic layer Su mentioned above may be provided, for example, by applying a hydrophobic agent to the gas diffusion layer 22. As a result, the surface of the hydrophilic part 26 on the side of the separator shows a hydrophobicity higher than the surface on the side of the separator 15 at the electrode part 23.

A difference in hydrophobicity between a surface of the hydrophobic layer Su and a surface of the gas diffusion layer 22 at the electrode part 23 can be calculated from a difference in a contact angle of ethylene glycol. Further it is preferable that a difference (θ1-θ2) between a contact angle θ1 of ethylene glycol on the surface of the hydrophobic layer Su and a contact angle θ2 of ethylene glycol on the surface of the gas diffusion layer 22 on the side of the separator at the electrode part 23 is not less than −20 degrees and not greater than 20 degrees.

Further, the contact angle θ1 of ethylene glycol on the surface of the hydrophobic layer Su is greater than a contact angle of ethylene glycol on the separator 15 itself.

Further, as shown in FIG. 2, between the membrane electrode assembly 10 and the separator 14, between the membrane electrode assembly 10 and the separator 15, and between the separator 15 and a separator (not shown) of a single cell 1 neighboring the separator 15, seal members 17 are arranged, respectively, and a plurality of the single cells 1 are stacked as the stack body 2. In addition, as shown in FIG. 1, in the fuel cell FC, the stack body 2 at both sides thereof is sandwiched between a pair of end plate 3 and 4 to be supported. As shown in FIG. 2 the end plate 3 has through holes 3a, 3b, 3c, 3d, 3e, and 3f at corresponding locations of the through holes 14a, 14b, 14c, 14d, 14e, and 14f of the separator 14 and corresponding locations of the through holes 15a, 15b, 15c, 15d, 15e, and 15f of the separator 15, respectively. The through hole 3a is provided as a supplying inlet of the air (reaction gas). The through hole 3f is provided as a discharging outlet of the air (reaction gas). The through hole 3d is provided as a supplying inlet of hydrogen (reaction gas). The through hole 3c is provided as a discharging outlet of hydrogen (reaction gas). The through hole 3b is provided as a supplying inlet of the coolant water, and the through hole 3e is provided as an discharging outlet of the coolant water.

Next, will be described an operation of the fuel cell FC of the embodiment.

In the fuel cell FC, when the humidified hydrogen (reaction gas) is supplied through the through hole 3d of the end plate 3 shown in FIG. 1, the hydrogen flows into the supplying passage formed by connection of the through hole 14d and the through hole 15d of each single cell 1 (see FIG. 2). In each single cell 1, the hydrogen flows into the fluid passage 14s of the separator 14 through the connection passages 14d and 14g of the separator 14. Next, the hydrogen flowing into the fluid passage 14s is exhausted to the through hole 14c through the connection passage of the separator 14. More specifically, the hydrogen flows into the discharging passage formed by connecting the through hole 14c and the through hole 15c (see FIG. 2). Then, the hydrogen is discharged from the through hole 3c in the end plate 3.

On the other hand, when the humidified air is supplied through the through hole 3a of the end plate 3 shown in FIG. 3, the air flows into the supplying passage formed by connecting the through hole 14a and the through hole 15a (see FIG. 2) of the stacked single cells 1. In each single cell 1, the air flows into the fluid passage 15s through the through hole 15a and connection passage 15g of the separator 15, shown in FIG. 3. The air flowing into the fluid passage 15s is discharged to the through hole 15f through the connection passage 15h of the separator 15. More specifically, the air flows into the discharging hole (not shown) formed by connection of the through hole 14f, a through hole of the seal member 17, and the through hole 15 (see FIG. 2). The air is discharged through the through hole 3f of the end plate 3 shown in FIG. 1.

In the fuel cell FC, when the hydrogen flows into the fluid passage 14s of the separator 14 and the air flows into the fluid passage 15s at each single cell 1, the hydrogen is diffused toward the anode 12 through the gas diffusion layer 21 of the membrane electrode assembly 10 shown in FIG. 4B. The air is diffused toward the cathode 13 through the gas diffusion layer 22 of the membrane electrode assembly 10. As a result, at the anode 12, hydrogen is oxidized into protons (hydrogen ions) and electrons on the catalyst, and the protons permeate through the solid polymer electrolytic membrane 20 into the cathode 13. The electrons move through an external load to the cathode 13. The electrons generated at the anode 12 are taken out from a terminal (not shown) and returns to the cathode 13 through the external load. On the other hand, at the cathode 13, the catalyst causes a reaction among the protons permeated through the solid polymer electrolytic membrane 20, the oxygen in the air, and the electrons from the external load to generate water.

As shown in FIG. 4C, the water generated by the cathode 13 comes out on a surface of the electrode part 23 (gas diffusion layer 22) on the side of the separator 15 as a water drop W. The water drop W is carried by the reaction gas G flowing through the fluid passage 15s formed in the separator 15 toward the outlet of the air formed at a vertically lower part of the separator 15, i.e., the connection passage 15h.

Here, the surface of the non-electric-power generating part 24 in the vicinity of the connection passage 15h at the vertically lower part where many water drops are collected has a hydrophobicity higher than the surface of the electrode part 23 on the side of the separator 15 (fluid passage 15s). This prevents the water drops W carried to the outlet of the air (the connection passage 15h) from penetrating the non-electric-power generating part 24 (hydrophilic part 26). In other words, the water drops W are efficiently discharged through the connection passage 15h. Thus, according to the fuel cell FC, decrease in the electric power generation capability can be effectively prevented.

More specifically, in the fuel cell FC, the difference of ($\theta1$-$\theta2$) between the contact angle $\theta1$ of ethylene glycol on the surface of the hydrophobic layer Su and the contact angle $\theta2$ of ethylene glycol on the surface of the electrode part 23 on the side of the separator 15 is set to be equal to or greater than −20 degrees. This prevents the water drops W from staying at the surface of the hydrophobic layer Su. Further, the difference of ($\theta1$-$\theta2$) is set to be equal to or lower than 20 degrees. This decreases a resistance in movement of the water drops W from the surface of the electrode part 23 on the side of the separator 15 to the surface of the hydrophobic layer Su. As a result, the water drops W are efficiently discharged from the connection passage 15h.

In addition, in the fuel cell FC, the contact angle $\theta1$ of ethylene glycol on the surface of the hydrophobic layer Su is set to be greater than the contact angle of ethylene glycol on the surface of the separator 15. This reduces a resistance in movement of the water drops W from the surface of the hydrophobic layer Su to the surface of the separator 15. As a result, the water drops W are further efficiently discharged toward the connection passage 15h formed in the separator 15 from the membrane electrolytic assembly 10.

Figure 5A:
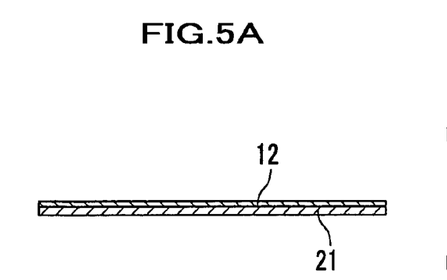
Figure 5B:
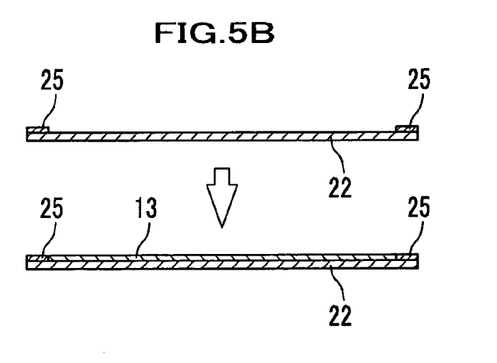
Figure 5C:
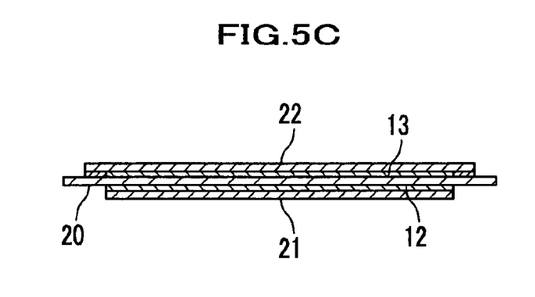
Figure 5D:
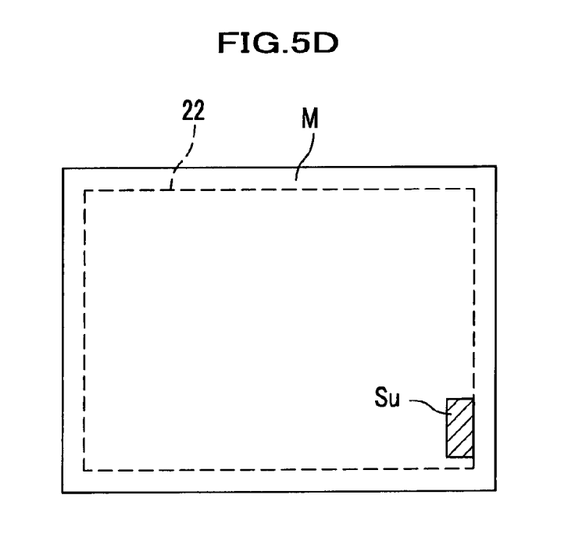

With reference to drawings will be described a method of producing the fuel cell FC. FIGS. 5A to 5D show a process of producing the membrane electrolytic assembly in which FIG. 5A to 5C are cross-sectional views of the membrane electrolytic assembly, and FIG. 5D is a plan view of the membrane electrolytic assembly.

In the method of producing the fuel cell FC according the embodiment, as shown in FIG. 5A, the anode 12 is formed on one side of the gas diffusion layer 21. More specifically, a catalyst paste mentioned above is coated on one surface of the gas-permeable material (plate) via a backing (not shown) and then dried.

On the other hand, a predetermined backing (not shown) is formed on one surface of a gas-permeable material (plate) as the gas diffusion layer 22, and the adhesive mentioned above is coated on a peripheral part of the backing to form the adhesive layer 25. This makes a part of the gas diffusion layer 22 facing the adhesive layer 25 hydrophilic as the hydrophilic part 26 (see FIG. 4C). Thus, the hydrophilic part 26 is formed on the non-electric-power generating part 24. Next, the catalyst paste is coated on one side of the gas diffusion layer 22 inside the adhesive layer 25 to form the cathode 13.

Next, as shown in FIG. 5C, the solid polymer electrolytic membrane 20 prepared is placed on one surface of the anode 12 with the gas diffusion layer 21, and then, the cathode 13 with the gas diffusion layer 22 is placed on the solid polymer electrolytic membrane 20. Next, the solid polymer electrolytic membrane 20, the gas diffusion layer 21, the anode 12, the gas diffusion layer 22, and the cathode 13 are pressed under application of heat for integration.

Next, a mask M is applied to the gas diffusion layer 22 and the solid polymer electrolytic membrane 20. The mask M, having an opening at a part corresponding to the hydrophobic layer Su, covers the gas diffusion layer 22 and the solid polymer electrolytic membrane 20 other than the opening. Next, a hydrophobic agent is applied to the gas diffusion layer 22 using the mask M. This is a hydrophobic process. Then, the hydrophobic layer Su is formed on the gas diffusion layer 22 at the opening of the mask M to form the membrane electrode assembly 10 (see FIG. 4B).

Next, the produced membrane electrode assembly 10, the separators 14 and 15, and the seal members 17 are assembled into a single cell 1. A plurality of the single cells 1 are stacked to be the stack body 2, and the end plates 3 and 4 are attached to on both ends of the stack body 2 to form the fuel cell FC.

Second Embodiment

Figure 6A:
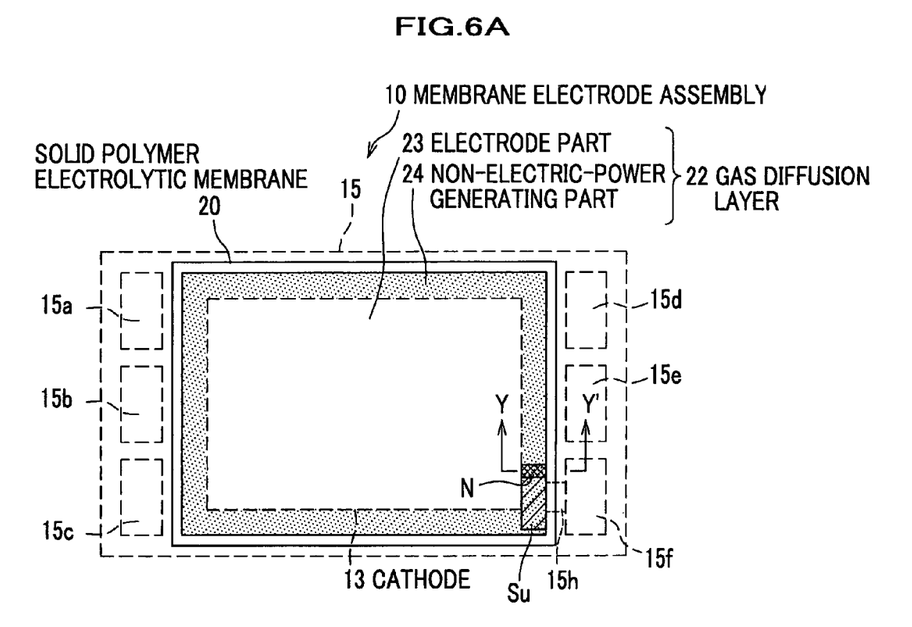
FIG. 6A is a plan view of the membrane electrode assembly of a fuel cell according to a second embodiment, viewed from the side of the cathode.
Figure 6B:
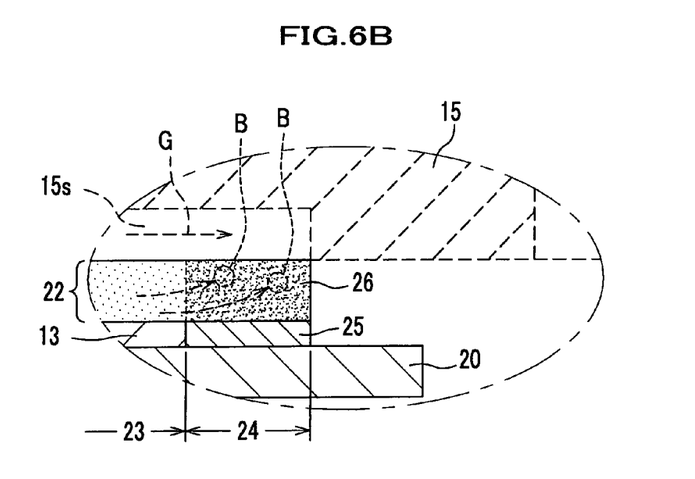
FIG. 6B is a sectional view, taken along ling Y-Y' in FIG. 6A.

Next, with reference to drawings will be described a fuel cell according to a second embodiment of the present invention. FIG. 6A is a plan view of the membrane electrode assembly of the fuel cell according to the second embodiment viewed from the side of the cathode. FIG. 6B is a cross-sectional view taken along line Y-Y' shown in FIG. 6A. In FIG. 6B, the seal member 17 is omitted.

The fuel cell according to the second embodiment is different from the fuel cell FC according to the first embodiment only in the membrane electrode assembly, and thus, the membrane electrode assembly is mainly described in the second embodiment. In addition, the same or corresponding elements are designated with like references, and thus a detailed description is omitted.

As shown in FIG. 6A, in the membrane electrode assembly 10a of the fuel cell according to the second embodiment, is hydrophilized the non-electric-power generating part 24 adhered to the solid polymer electrolytic membrane 20 with the adhesive layer 25 (see FIG. 4B) as the hydrophilic part 26 (see FIG. 4C) similarly to the first embodiment.

In the membrane electrode assembly 10a, the hydrophobic process is applied to a part (lower in FIG. 6A) of a surface of the hydrophilic part 26 on the side of the separator 15 in the vicinity of the connection passage 15h (around the outlet of the air in the separator 15) as the hydrophobic layer Su except at least one part N (upper in FIG. 6A) of the surface of the hydrophilic part 26 on the side of the separator 15, wherein the part to be subjected to the hydrophobic process is lower than the one part N in the vertical direction. Here, it is preferable that the contact angle of ethylene glycol on a surface of the hydrophobic layer Su is equal to or greater than 100 degrees and the contact angle of ethylene glycol on the one part N, to which the hydrophobic process is not applied, is equal to or smaller than 90 degrees.

In addition, the contact angle of ethylene glycol on the hydrophobic layer Su is equal to or smaller than 150 degrees. This is because the contact angle of 150 degrees provides a sufficient hydrophobic effect. On the other hand, a contact angle at the one part N is preferably equal to or greater than 10 degrees. This is because the one part N serves to attract water sufficiently without any other additional hydrophilic processing.

In the fuel cell FC according to the second embodiment, similar to the fuel cell FC according to the first embodiment, the water drop W is carried by the reaction gas G flowing the fluid passage 15s formed in the separator 15 in addition to the force of gravity to the outlet of the air formed at a lower part (in the vertical direction) of the separator 15.

The surface of the hydrophobic layer Su, being lower (in the vertical direction) than the one part N, where many water drops W are collected, shows a high hydrophobicity than the surface of the electrode part 23 on the side of the separator 15. This prevents the water drops W carried in the vicinity of the outlet of the air (around the connection passage 15h) from penetrating the non-electric-power generating part 24 (hydrophilic part 26). In other words, the water drops W are efficiently discharged from the connection passage 15h. Thus, according to the fuel cell FC, decrease in the electric power generation capability can be effectively prevented.

Further, the one part N (above the hydrophobic layer Su), where a smaller quantity of water is collected than the hydrophobic layer Su, pulls water B generated in the electrode part 23 as shown in FIG. 6B. The pulled-in water B is vaporized by the reaction gas G flowing beside the one part N and then discharged from the connection passage 15h (see FIG. 4C). In addition, because containing a small quantity of water, the one part N pulls in water (not shown) from a part of the hydrophilic part 26 (see FIG. 4C) on which the hydrophobic layer Su is formed. The pulled-in water is vaporized by the reaction gas G flowing beside the one part N of the hydrophilic part 26 and discharged through the connection passage 15h (see FIG. 4C). Thus, the fuel cell FC according to the second embodiment can more effectively prevent decrease in the electric power generation capability.

The present invention is not limited to the first and second embodiments and has modifications.

[Modifications]

Figure 7:
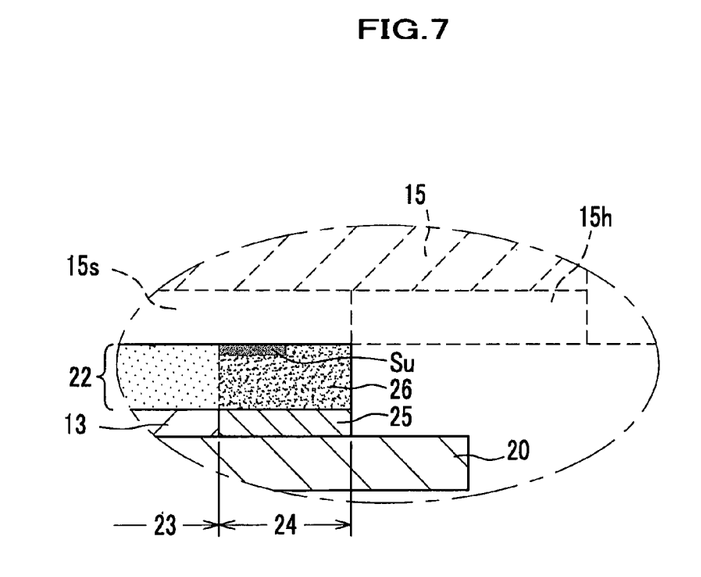
FIG. 7 is a sectional view of a part of a gas diffusion layer where a hydrophobic layer is formed on a hydrophilic layer in the vicinity of the outlet of the reaction gas.

In the first embodiment, the hydrophobic layer Su is formed over the entire surface of the hydrophilic part 26 in the vicinity of the connection passage 15h (outlet of the reaction gas). However, the present invention is applicable to the case where the hydrophobic layer Su is formed on only a part of the surface of the hydrophilic part 26 in the vicinity of the connection passage 15h. FIG. 7 shows such a case in a sectional view of the gas diffusion layer on which the hydrophobic layer is formed only on a part of the surface of the hydrophilic layer (in the direction of flow of the gas G) in the vicinity of the outlet of the reaction gas. In FIG. 7, the seal member is omitted for simply illustrating.

As shown in FIG. 7, the hydrophobic layer Su in the modification is formed only on a part of the surface of the hydrophilic part 26 neighboring to the electrode part 23, but not formed on the surface of the hydrophilic part 26 on the side of the connection passage 15h (in the direction of flow of the gas G).

In addition, in the first and second embodiments, the hydrophobic layer Su is formed only on the hydrophilic part 26 in the vicinity of the connection passage 15h. However, the present invention includes a structure in which the hydrophobic layer Su may be formed over the entire surface of the hydrophilic part 26 to surround the electrode part 23.

Further, in the first and second embodiments, the hydrophilic layer 26 and the hydrophobic layer Su are formed only on the gas diffusion layer 21 on the side of the cathode 13. However, the present invention includes a structure in which the hydrophilic part 26 and the hydrophobic layer Su are formed on the gas diffusion layer 21 on the side of the anode 12. In this case, on the gas diffusion layer 21, similar to the gas diffusion layer on the side of the cathode 13 are formed, an electrode part (not shown) facing the anode 12 and a non-electric-power generating part (not shown) facing the solid polymer electrolytic membrane 20 around the electrode part. Further, the hydrophilic part (not shown) is formed on the non-electric-power generating part and the hydrophobic process is applied to a surface (surface of the hydrophilic part on the side of separator 14) in the vicinity of the connection passage 14h, i.e., around the outlet of hydrogen in the separator 14.

EXAMPLES

Hereinafter, will be described examples of the present invention. Here, the present invention is unlimited to these examples.

Example 1

In the Example 1, the membrane electrode assembly 10 is produced in accordance with the process shown in FIGS. 5A to 5D. First, as shown in FIG. 5A, a backing layer (not shown) was formed on one surface of a carbon paper (TGP-H-060, produced by TORAY INDUSTRIES, INC.) as the gas permeable material. Then, the catalyst paste was coated on the backing layer and dried to form the gas diffusion layer 21 and the anode 12. To form the backing layer, a mixture is used which contains 4 mass parts of carbon black, 6 mass parts of polytetrafluoroethylene particls, and an appropriate quantity of ethylene glycol. For the catalyst paste was used a mixture containing one mass part of platinum particles, one mass part of carbon black, 1.2 mass part of par full oroarukiren sulfonic acid high polymer compound (Nafion (registered trade mark) manufactured by Du Pont), and an appropriate quantity of organic solvent. A quantity of the coated catalyst paste, converted into the mass of platinum for each coated area, was is 0.5 mg/cm². Drying was performed by heating for 15 minutes at 120° C. under a reduce pressure after heating at 60 C for ten minutes.

On the other hand, as shown in FIG. 5B, the backing layer (not shown) similar to the backing layer on one surface of the carbon paper was formed as well as the adhesive was coated on a peripheral part of one surface by screen printing to form the adhesive layer 25. As the adhesive was used a silicone adhesive (KE4898 manufactured by Shin-Etsu Chemical Co., Ltd.). Thus, the hydrophilic part 26 was formed as shown in FIG. 4C. On one surface of the gas diffusion layer 22, was formed the cathode 13 by coating and drying the catalyst paste inside the adhesive layer 25.

Next, as shown in FIG. 5C, on one surface of the prepared solid polymer electrolytic membrane 20, was placed the anode 12 with the gas diffusion layer 21, and on the other surface of the solid polymer electrolytic membrane 20 was placed a cathode with the gas diffusion layer 22. The solid polymer electrolytic membrane 20 was produced by a casting method from a solution obtained by dissolving par full oroarukiren sulfonic acid high polymer compound (Nafion (registered trade mark) manufactured by Du Pont) in an organic solvent. The solid polymer electrolytic membrane 20, the gas diffusion layer 21, the anode 12, the gas diffusion layer 22, and the cathode 13 were pressed at 2.5 MPa under application of heat at 150 C for integration.

Next, as shown in FIG. 5D, the mask M was applied to the gas diffusion layer 22 and the solid polymer electrolytic membrane 20, and then, a fluorine-based release agent (DAIFREE (registered trademark) manufactured by DAIKIN INDUSTRIES, ltd.) as the hydrophobic agent was sprayed on the gas diffusion layer 22 through the mask M. In this process, a distance of spraying to the mask M is 50 cm and time interval of spraying is 10 seconds. As a result, as shown in FIG. 4B, the membrane electrode assembly 10 was obtained in which the hydrophobic layer Su was formed on the surface of the gas diffusion layer 22 at the opening of the mask M. Both the anode and the cathode 13 of the membrane electrode assembly 10 had electrode areas of 400 cm².

Next, contact angles of ethylene glycol on the surface of the electrode part 23 (see FIG. 4A) and on the surface of the hydrophobic layer Su formed on the hydrophilic part 26 were measured. The measurement was carried under atmosphere at 23 C and Rh of 50% using a measurement apparatus of a CA-X type manufactured by Kyowa Interface Science Co., LTD. As a result, the contact angle θ2 of ethylene glycol on the surface of the electrode part 23 (see FIG. 4A) is 124 degrees, and the contact angle θ1 of ethylene glycol on the surface of the hydrophobic layer Su is 127 degrees. In Table (1), the contact angle θ1 on the hydrophobic layer Su is denoted as "contact angle θ1", and the difference of (θ1-θ2) between the contact angle θ1 and the contact angle θ2 on the surface of the electrode part 23 on the side of the separator 15 is denoted as "contact angle difference (θ1-θ2).

TABLE (1)

| | contact angle θ1 (deg) | contact angle difference (θ1 − θ2) (deg) |
|---|---|---|
| Example 1 | 127 (hydrophobic layer) | 3 |
| Example 2 | 142 (hydrophobic layer) | 18 |
| Example 3 | 109 (hydrophobic layer) | −15 |
| Example 4 | 98 (hydrophobic layer) | −26 |
| Example 5 | 91 (hydrophobic layer) | −33 |
| Comparison Example 1 | 83 (hydrophilic part) | −41 |

Figure 8:
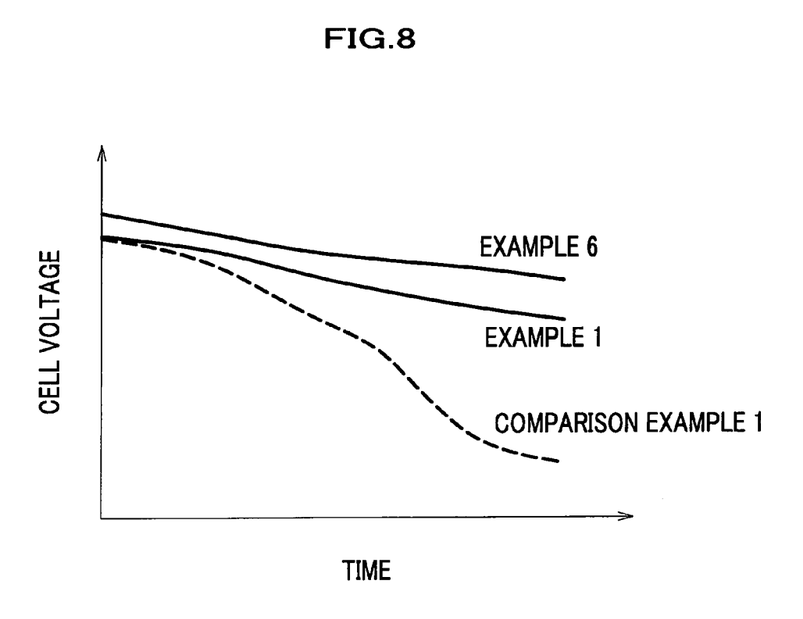
FIG. 8 is a chart for showing variations of the cell voltages measured during electric power generation with single cells of examples and a comparison example.

Next, the membrane electrode assembly 10 is sandwiched between the separators 14 and 15 plated with gold to produce the single cell 1 (see FIG. 2). The anode 12 of the single cell 1 (see FIG. 2) was supplied with pure hydrogen (at a humidifying rate of 90%), and the cathode 13 (see FIG. 2) was supplied with air (at a humidifying rate of 90%) to generate an electric power, and a cell voltage was measured from the start of generating the electric power for five hundred hours. FIG. 8 shows the result. As the electric power generation condition, a current density was set to 0.8 A/cm$^2$, and a temperature of the cell (a temperature at the coolant inlet) was set to 80° C. Further, both of a hydrogen utilization rate and an air utilization rate at the single cell were 75%.

Figure 9:
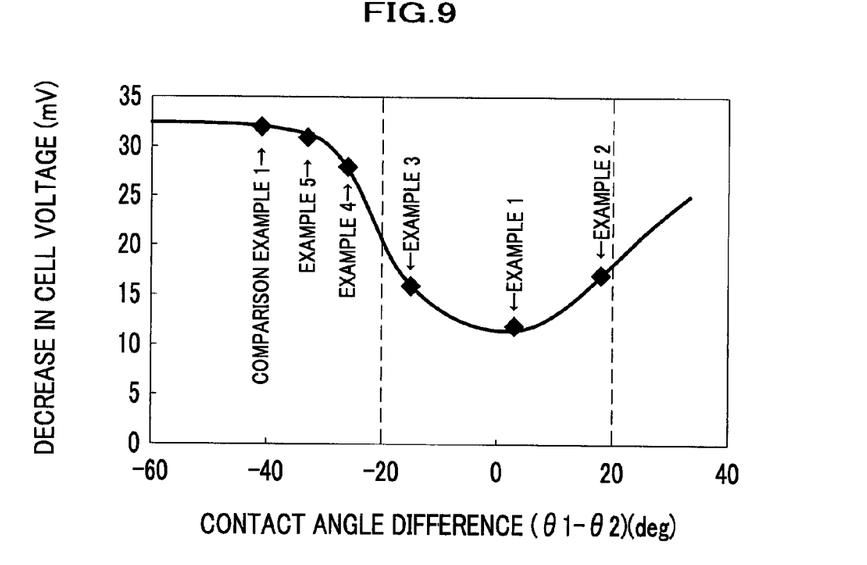
FIG. 9 is a chart for showing decrease in the cell voltages with respect to difference in contact angles.

Next, a difference between the cell voltage at the start of the electric power generation and the cell voltage after 500 hours (cell voltage decrease quantity) was calculated. FIG. 9 shows this result.

Examples 2 to 5

The membrane electrode assemblies 10 of Example 2 to Example 5 were produced similarly to the Example 1 except that a spray interval of the fluorine-based release agent was adjusted in a range from one second to 20 seconds. Similar to Example 1, the contact angle θ1 of ethylene glycol on the surface of the hydrophobic layer Su formed on the hydrophilic part 26 is measured as well as the difference of (θ1-θ2) between the contact angle θ1 and the contact angle θ2 of ethylene glycol on the electrode part 23 on the side of the separator 15 is obtained. Table (1) shows the result.

Single cells 1 similar to the single cell 1 in the Example 1 were produced using the membrane electrode assemblies 10. Further, the difference in voltages between the cell voltage at the start of the electric power generation and the cell voltage after 500 hours were calculated similarly to the Example 1. FIG. 9 shows the result.

Comparison Example 1

A membrane electrode assembly 10 was produced similarly to the Example 1 except that the hydrophobic layer Su is not provided on the hydrophilic part 26 without spraying the fluorine-based release agent. Similarly to Example 1, the contact angle θ1 of ethylene glycol on the surface of the hydrophobic layer Su formed on the hydrophilic part 26 was measured as well as the difference of (θ1-θ2) between the contact angle θ1 and the contact angle θ2 of ethylene glycol on the electrode part 23 on the side of the separator 15 is obtained. Table (1) shows this result.

Next, the single cells 1 were produced similarly to the single cell the Example 1 using the membrane electrode assemblies 10. The single cells 1 were used to generate electric powers, and cell voltages were measured from the start of the electric power generation for 500 hours. FIG. 8 shows this result. Further, differences (decreases in the cell voltage) between the cell voltage at the start of generating an electric power and the cell voltage after 500 hours were calculated similarly to FIG. 1. FIG. 9 shows the result.

Estimation of Cell Voltage

As shown in FIG. 8, the single cell 1 according to the Example 1 shows a better electric power generation capability (cell voltage) than the Comparison Example 1 even if the power generating time elapses. This is presumably attributed to efficient discharge of the generated water from the single cell 1.

Further, as shown in FIG. 9, the difference of (θ1-θ2) between the contact angle θ1 of ethylene glycol on the hydrophobic layer Su and the contact angle θ2 of ethylene glycol on the surface of the electrode part 23 on the side of the separator 15 is made equal to or greater than −20° and equal to or smaller than 20 degrees. This reduces decrease in the cell voltage with passage of the power generating time. This is presumably attributed to prevention of the water drops W staying on the hydrophobic layer Su by making the difference (θ1-θ2) between the contact angle θ1 of ethylene glycol at the surface of the electrode part 23 on the side of the separator 15 equal to or greater than −20 degrees. Further, this is presumably attributed to reduction in the resistance in movement of the water drops W from the surface of the electrode part 23 on the side of separator 15 to the surface of the hydrophobic layer Su as a result of the difference of (θ1-θ2) being made equal to or lower than 20 degrees.

Example 6

Figure 10:
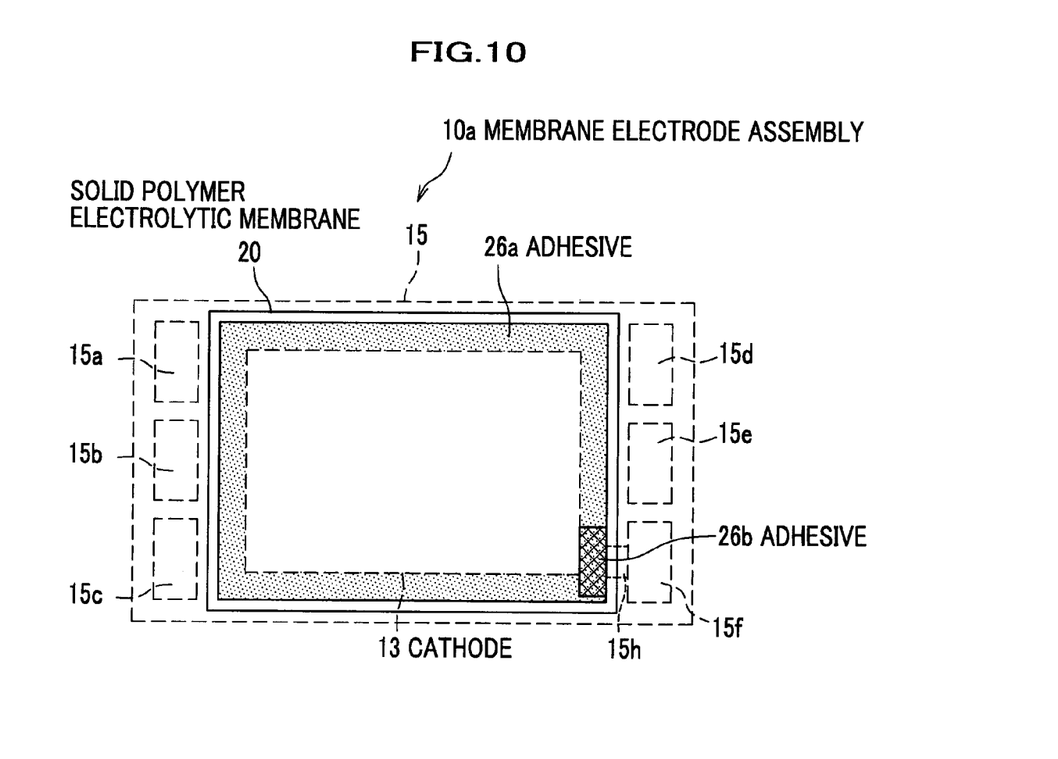
FIG. 10 is an illustration for showing arrangement of two types of adhesives forming the adhesive layers in a sixth example.

In Example 6, a membrane electrode assembly 10a is produced as shown in FIG. 6A. Regarding the adhesive layer 25 formed to surround the electrode 23, a part thereof in the vicinity of the connection passage 15h is formed with an adhesive being more hydrophilic than that of the adhesive used at the remaining part. FIG. 10 shows an arrangement of two types of adhesives forming the adhesive layer 25.

In the membrane electrode assembly 10a used in the Example 6, as the adhesive 26b forming the adhesive layer 25 (see FIG. 6A) in the vicinity of the connection passage shown in FIG. 10, a mixture was used which contains 9.5 mass percentages of the silicone adhesive (KE4898 manufactured by Shin-Etsu Chemical Co., Ltd.), 12 mass percentages of titanium deoxidize, 3 mass percentages of poly-vinyl alcohol, 0.5 mass percentages of 4,4'-oxybis (benzene sulfonyl hydrazide), and 5 mass percentages of carbon fibers (SHOWA DENKO K.K). As the adhesive 26a forming the remaining part other than the adhesive layer 25 in the vicinity of the connection passage 15h, as shown in FIG. 10, only the silicone adhesive (KE4898 manufactured by Shin-Etsu Chemical Co., Ltd.) is used. The membrane electrode assembly 10a is obtained by pressing the solid polymer electrolytic membrane 20, the gas diffusion layer 21, the anode 12, the gas diffusion layer 22, and the cathode 13 with 2.5 MPa under application of heat at 160° C. for 15 minutes for integration.

As shown in FIG. 6A, in the membrane electrolytic electrode assembly 10a, the hydrophobic layer Su is formed at a part of the surface of the non-electric-power generating part 24 (the part hydrophilized by the adhesive 26) in the vicinity of the connection passage 15h except the one upper part N similarly to the first embodiment.

Next, the contact angles of ethylene glycol were measured on the surface of the electrode part 23 (see FIG. 6A) and the surface of the hydrophobic layer Su. The contact angle θ2 of ethylene glycol on the electrode part 23 is 124 degrees and the contact angle θ1 of ethylene glycol on the hydrophobic layer Su is 118 degrees.

The single cell 1 was produced similarly to the first embodiment except that the membrane electrode assembly 10a produced as mentioned above is used. The produced single cell 1 was used to generate an electric power similarly to the Example 1, and the cell voltage was measured from the start of the electric power generation to time when 500 hours elapsed. FIG. 8 shows the result.

Estimation of Cell Voltage

As shown in FIG. 8, the single cell 1 according to the Embodiment 6 shows a more preferable electric power generation capability (cell voltage) than the single cell 1 in the Comparison Example 1 even if the electric power generating time elapsed. This is presumably attributed to the fact that the generated water is efficiently discharged from the single cell. In addition, the single cell 1 according to the Example 6 shows a preferable power generation capability (cell voltage) than the single cell 1 according to the Example 1. This is presumably attributed to the fact that the water contained in the hydrophilic part 26 (hydrophilic part 26 on which the hydrophobic layer Su is formed) which is lower in the vertical direction penetrates the upper (in the vertical direction) part of the hydrophilic part 26 as well as the penetrating water is vaporized by the air (reaction gas), so that the generated water is further efficiently discharged from the single cell.

In the above-mentioned embodiments, the hydrophilic part 26 has a water-absorbency to absorb water in the gas-diffusion layer 22 to carry the water to a surface of the part exposed to the separator 15 to vaporize the carried water in the reaction gas flowing through the fluid passage 15h.

The invention claimed is:

1. A fuel cell comprising:
    a membrane electrode assembly including:
        a solid polymer electrolytic membrane;
        an electrode catalytic layer and a diffusion layer on both surfaces of the solid polymer electrolytic membrane, respectively; and
        a pair of separators including fluid passages of reaction gases for sandwiching the membrane electrode assembly, wherein
    the diffusion layer includes:
        an electrode part having one surface in contact with the electrode catalytic layer and the other surface facing the separator; and
        a non-electric-power generating part around the electrode part having one surface in contact with the solid polymer electrolytic membrane and the other surface facing the separator, and wherein
    the non-electric-power generating part includes, in the vicinity of an outlet of the fluid passage of the reaction gas, a hydrophilic part and a hydrophobic part formed on the hydrophilic part and exposed to the fluid passage.

2. The fuel cell as claimed in claim 1, wherein the hydrophobic part has a contact angle $\theta 1$ of ethylene glycol, the electrode part has a contact angle $\theta 2$ of ethylene glycol, and a difference of $(\theta 1-\theta 2)$ is equal to or greater than −20 degrees and equal to or smaller than 20 degrees.

3. The fuel cell as claimed in claim 1, wherein, when an extending plane of the membrane electrode assembly is arranged in a vertical direction and the outlet of fluid passage of the reaction gas is arranged at a lower position of the fuel cell, the hydrophilic part has a part exposed to the separator, and wherein the hydrophobic part is arranged lower than the part of the hydrophilic part exposed to the separator.

4. The fuel cell as claimed in claim 3, wherein the hydrophobic part has a contact angle of ethylene glycol which is equal to or greater than 100 degrees and the part of the hydrophilic part has a contact angle of ethylene glycol which is smaller than 90 degrees.

5. The fuel cell as claimed in claim 3, wherein the hydrophilic part has a water-absorbency to absorb water in the diffusion layer to carry the water to a surface of the part exposed to the separator to vaporize the carried water in the reaction gas flowing through the fluid passage.

6. The fuel cell as claimed in claim 1, wherein the hydrophobic part has a contact angle of ethylene glycol which is grater than the contact angle of a surface of the separator in the fluid passage.

7. The fuel cell as claimed in claim 1, wherein the hydrophilic part has a contact angle of ethylene glycol thereon smaller than 90 degrees and the hydrophobic part has a contact angle of ethylene glycol thereon equal to or greater than 90 degrees.

8. A method of producing a fuel cell including a membrane electrode assembly including: a membrane electrode assembly including: a solid polymer electrolytic membrane; an electrode catalytic layer and a diffusion layer on both surfaces of the solid polymer electrolytic membrane, respectively; and a pair of separators including fluid passages of reaction gases for sandwiching the membrane electrode assembly, wherein the diffusion layer includes: an electrode part having one surface in contact with the electrode catalytic layer and the other surface facing the separator; and a non-electric-power generating part around the electrode part having one surface in contact with the solid polymer electrolytic membrane and the other surface facing the separator, the method comprising:
    a first process of forming a hydrophilic part at the non-electric-power generating part in the vicinity of an outlet of the fluid passage of the reaction gas; and
    a second process includes a hydrophobic process on a surface of the hydrophilic part on the side of the separator after the first process.

9. The method as claimed in claim 8, wherein the hydrophobic process includes a step of applying a hydrophobic agent on the surface of the hydrophilic part.

* * * * *